United States Patent
Schroeder et al.

[11] Patent Number: 6,086,143
[45] Date of Patent: Jul. 11, 2000

[54] HARD MOUNTED PROVISION THROUGH PLASTIC BODY PANEL

[75] Inventors: Del C. Schroeder, Bloomfield Hills; David J. Kowall, Hartland; David G. Speth, Sylvan Lake, all of Mich.

[73] Assignee: DaimlerChrysler Corporation, Auburn Hills, Mich.

[21] Appl. No.: 09/350,721

[22] Filed: Jul. 9, 1999

[51] Int. Cl.[7] .............................. B62D 24/00; B60J 5/00
[52] U.S. Cl. ...................... 296/191; 296/146.11; 296/29; 296/901
[58] Field of Search .................................. 296/901, 191, 296/187, 29, 146.11

[56] References Cited

U.S. PATENT DOCUMENTS

| | | |
|---|---|---|
| 2,122,007 | 6/1938 | Kearney . |
| 4,221,425 | 9/1980 | Welle et al. . |
| 4,412,698 | 11/1983 | Kingsley ................................... 296/97 |
| 5,029,364 | 7/1991 | Salazar . |
| 5,088,154 | 2/1992 | Ishikawa . |
| 5,385,383 | 1/1995 | Kreis et al. . |
| 5,624,150 | 4/1997 | Venier ................................ 296/146.11 |
| 5,791,018 | 8/1998 | Yoshinobu . |

Primary Examiner—Dennis H. Pedder
Assistant Examiner—Mickki D. Murray

[57] ABSTRACT

An apparatus for mounting components to a motor vehicle including a frame having a bonding face and a nut coupled to the frame where the nut has a mounting face protruding a distance from the bonding face. The apparatus further includes a plastic body panel having an inner face and an outer face defining a thickness substantially equivalent to the protrusion distance of the nut. The plastic panel further has an aperture extending through its thickness. The nut is disposed in the aperture. The inner face is coupled to the bonding face and the outer face is substantially co-planar to the mounting face. A vehicle component is secured to the frame by a threaded fastener which engages the nut. The vehicle component abuts directly against the mounting face of the nut so that little or no clamping forces are applied to the plastic body panel.

13 Claims, 1 Drawing Sheet

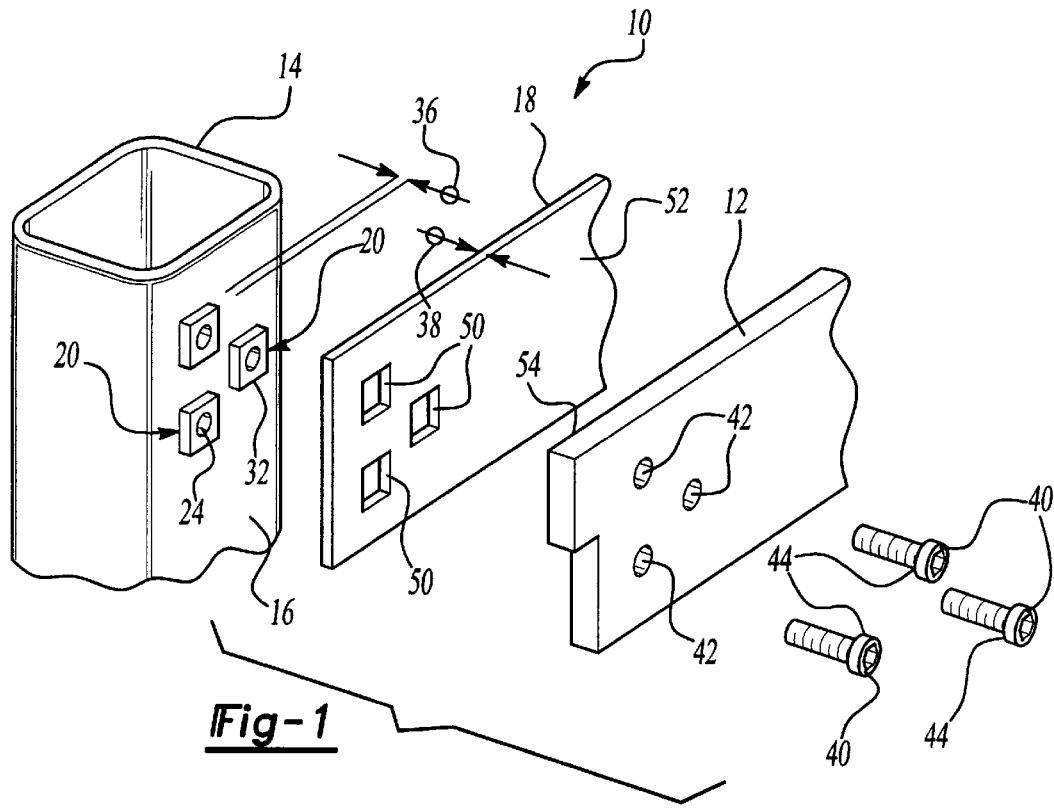
Fig-1
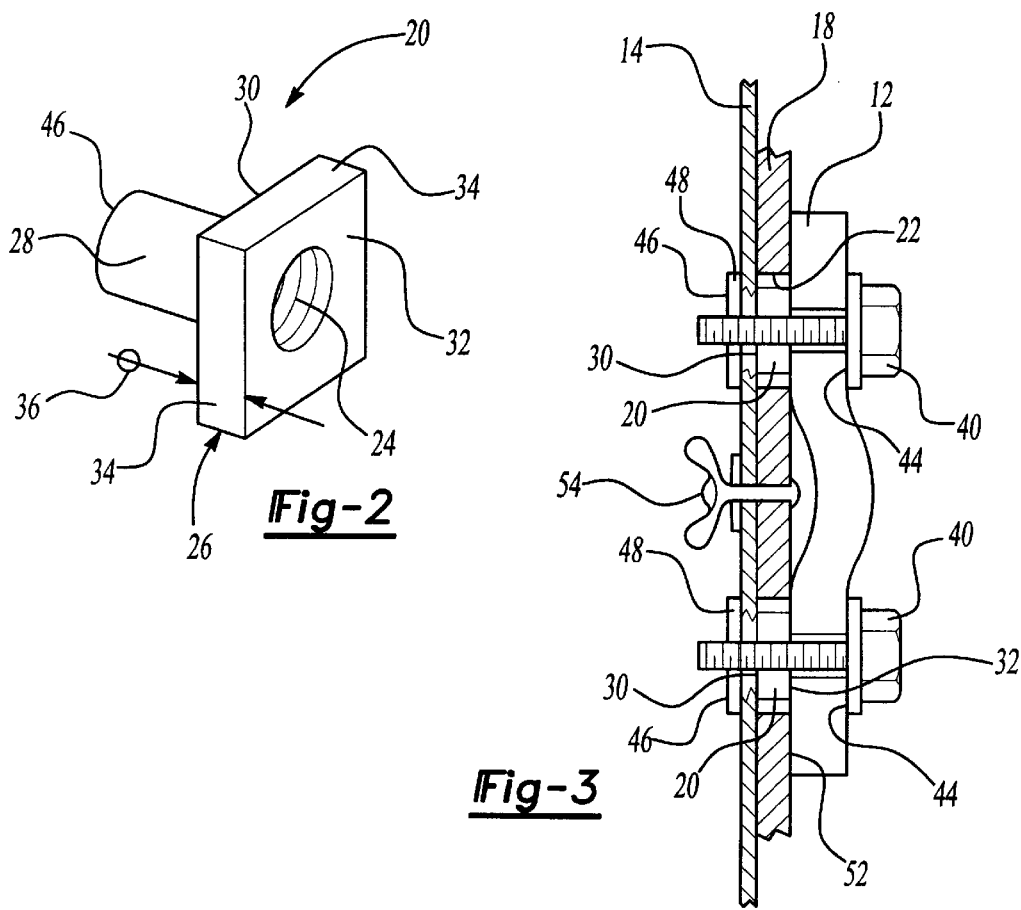
Fig-2
Fig-3

HARD MOUNTED PROVISION THROUGH PLASTIC BODY PANEL

BACKGROUND OF THE INVENTION

1. Technical Field

The present invention generally pertains to a system for mounting components to a vehicle body. More particularly, the present invention relates to a mechanism providing a hard mount through a plastic body panel for positive constant torque retention of hinges and other highly loaded body components.

2. Discussion

The use of plastic body panels within motor vehicles is on the increase due to the reduced weight, reduced cost, and increased formability of plastic in relation to steel. However, most of the plastic materials used in manufacturing motor vehicle structures do not exhibit the strength of their steel counterparts. Accordingly, when a highly loaded mechanical joint, such as the interconnection of a passenger door hinge and a vehicle body, includes a plastic body component, the mechanical integrity of the joint suffers. For example, many plastics will yield when placed under the load required to support the door. Depending on the compound used, the yielding process may rupture or otherwise cause the plastic component to fail.

The concern regarding low compressive strength has been previously addressed by embedding a metal reinforcement within the plastic component. In one example, a metal sleeve is molded into the component and a fastener is disposed within the sleeve to mount the component. This design has its disadvantages. Specifically, the plastic material encapsulating the metal insert creeps over time due to the high loads required to securely attach certain components to the vehicle. Once the plastic material flows from the area beneath the bolt head, the body of the bolt is no longer extended the desired amount. As such, the clamp load originally exerted by the bolt is substantially reduced, possibly leading to vibratory loosening and joint failure.

SUMMARY OF THE INVENTION

It is therefore an object of the present invention to provide a hard mount through a plastic body panel for attaching components to motor vehicles.

It is another object of the present invention to provide a structurally sound mechanical joint without the use of integrally molded metal inserts.

It is yet another object of the present invention to provide a cost-efficient method of maintaining joint integrity while utilizing plastic body panels.

According to the present invention, an apparatus for mounting components to a motor vehicle includes a frame having a bonding face and a nut member coupled to the frame where the nut member has a mounting face protruding a predetermined distance from the bonding face. The apparatus further includes a plastic body panel mounted to the bonding face of the frame. The plastic body panel has an inner face and an outer face defining a thickness substantially equivalent to the predetermined distance. The plastic panel further has an aperture extending through its thickness. The nut member is disposed in the aperture. The inner face is coupled to the bonding face and the outer face is substantially co-planar to the mounting face.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

FIG. 1 is an exploded perspective view of an embodiment of the hard mount in accordance with the present invention;

FIG. 2 is a perspective view of a pierce nut; and

FIG. 3 is a cross-sectional view of the hard mount of the present invention.

DETAILED DESCRIPTION OF THE PREFERRED EMBODIMENT

Referring initially to FIG. 1, a hard mount constructed in accordance with the teachings of an embodiment of the present invention is generally identified at reference numeral 10. Hard mount 10 is shown in a disassembled condition including a door hinge clasp 12 coupled to a pillar 14. In the preferred embodiment, pillar 14 is a hydroformed steel tube having a bonding face 16 adhesively joined to a plastic body panel 18. Hard mount 10 further includes a pierce nut 20 disposed within aperture 22 (best shown in FIG. 3) and coupled to pillar 14 in a manner described herein.

As shown in FIG. 2, pierce nut 20 includes an internal thread 24, a head 26 and a body 28. Head 26 is defined by a stop face 30, a mounting face 32, and a plurality of peripheral flats 34 extending between the stop face 30 and mounting face 32. A head thickness 36 is defined by the distance between stop face 30 and mounting face 32. Referring to FIGS. 1 and 3, head thickness 36 is designed to be substantially equal to a thickness 38 of plastic body panel 18. The preferred embodiment of hard mount 10 further includes a fastener 40 disposed within a fastener aperture 42 of door hinge clasp 12. Fastener 40 is threadingly engaged with the internal thread 24 of the pierce nut 20 creating a clamp force between pillar 14 and door hinge clasp 12. One skilled in the art will appreciate that plastic body panel 18 has been eliminated from the stack of components compressed between a fastener thrust face 44 and pillar 14 so as to create hard mount 10.

A description of the assembly of hard mount 10 follows. Referring to FIGS. 1 and 3, pillar 14 is commonly supplied as a continuous tube without aperture 22 located therein. One skilled in the art will appreciate that pierce nut 20 is designed to form aperture 22 as it is forced (by piercing) into the surface of pillar 14. One skilled in the art will further appreciate that pierce nut 20 may be mounted to any vehicle structural member such as a plate, a bar, or a frame, as the application may dictate. After body 28 of pierce nut 20 creates aperture 22, stop face 30 limits any further axial progression of pierce nut 20 into pillar 14. At this time, a die or ram is forced into end 46 of pierce nut 20 to create a flare 48 which crimps the pillar 14 between the flare 48 and stop piece 30. One skilled in the art will appreciate that other internally threaded fasteners such as weld nuts may be utilized without departing from the scope of the present invention. In addition, other methods of forming aperture 22 can be used.

Once the appropriate number of pierce nuts 20 are secured to pillar 14, plastic body panel 18 is mechanically coupled to pillar 14. As shown in FIGS. 1 and 3, hard mount 10 serves not only to provide a joint exhibiting superior structural integrity but provides the additional feature of plastic body panel alignment as well. Specifically, the shape and location of each pierce nut 20 is mimicked by a set of locating apertures 50 defined by plastic body panel 18. Plastic body panel 18 is mounted such that pierce nuts 20 are disposed within locating apertures 50 thereby assuring proper alignment of plastic body panel 18 on the vehicle. In addition, mounting face 32 of nut 20 enters locating aperture 50 to the point of becoming substantially co-planar with an outer surface 52 of plastic body panel 18. Plastic body panel 18 is coupled to the bonding face 16 of the pillar 14 in a manner commonly known in the art such as by riveting or adhesive bonding or both. Rivet 54 is shown in FIG. 3 as an illustration of such a coupling method. At this time, a variety of operations may be performed to the vehicle body not concerning hard mount 10.

At the appropriate time in the production sequence, a door assembly (not shown) including door hinge clasp 12 may be introduced and coupled to pillar 14 utilizing fasteners 40. Specifically, a door hinge clasp mounting surface 54 is placed into direct contact with nut mounting face 32. Fasteners 40 are disposed within apertures 42 provided in the door hinge clasp 12 and threadingly engaged with pierce nuts 20.

One skilled in the art will appreciate that a variety of automotive body components may be coupled in the manner shown in accordance with the present invention. Accordingly, vehicle body components such as hoods and deck lids that impart relatively high loads to the body are excellent candidates to benefit from the improved joint integrity provided by hard mount 10.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. An apparatus for mounting components to a motor vehicle comprising:
    a frame having a bonding face and an opening in communication with said bonding face;
    a nut member coupled to said frame and positioned over said opening wherein said nut member has a mounting face protruding a predetermined distance from said bonding face;
    a plastic body panel mounted to said bonding face of said frame, said plastic body panel having a portion with an inner face and an outer face defining a thickness substantially equivalent to said predetermined distance, said plastic panel further having an aperture extending through said thickness;
    wherein said nut member is disposed in said aperture of said plastic body panel and said outer face is substantially co-planar to said mounting face.

2. The apparatus for mounting components to a motor vehicle of claim 1, wherein said plastic body panel is adhesively bonded to said bonding face.

3. The apparatus for mounting components to a motor vehicle of claim 1, wherein said opening is created by forcing said nut through said frame.

4. The apparatus for mounting components to a motor vehicle of claim 3, wherein said nut has a head and a body and said nut is fixed to said frame by mechanically deforming said body to form a flare for retaining said frame between said head and said flare.

5. The apparatus for mounting components to a motor vehicle of claim 1, further including a door hinge clasp having a mounting surface wherein said door hinge clasp is coupled to said frame and said mounting surface is adjacent said nut mounting face.

6. The apparatus for mounting to a motor vehicle of claim 1, further including a vehicle component secured to said frame by a threaded fastener in engagement with said nut member, such that said vehicle component abuts directly against the nut member.

7. A motor vehicle having a hard mount for interconnecting body components comprising:
    a vehicle frame structure;
    a plastic body panel supported by said vehicle frame structure;
    a nut member having a stop face and a mounting face, said nut member coupled to said vehicle frame structure wherein said stop face engages said vehicle frame structure and wherein said plastic body panel has an inner face coupled to said vehicle frame structure and an outer face substantially co-planar with said mounting face of said nut member;
    a vehicle component having a fastener aperture, said vehicle component in direct contact with said mounting face of said nut member; and
    a fastener disposed in said fastener aperture of said vehicle component and said nut member for coupling said vehicle component to said vehicle frame structure.

8. The motor vehicle having a hard mount for interconnecting body components of claim 7, wherein said vehicle component is a door hinge.

9. The motor vehicle having a hard mount for interconnecting body components of claim 7, wherein said plastic body panel includes an aperture shaped to complement a peripheral surface of a head portion of said nut member, said head portion of said nut member being disposed within said aperture.

10. An apparatus for mounting components to a motor vehicle comprising:
    a frame having a bonding face;
    a nut member coupled to said frame wherein said nut member has a mounting face protruding a predetermined distance from said bonding face;
    a plastic body panel mounted to said bonding face of said frame, said plastic body panel having a portion with an inner face and an outer face defining a thickness substantially equivalent to said predetermined distance, said plastic panel further having an aperture extending through said thickness;
    wherein said nut member is disposed in said aperture of said plastic body panel and said outer face is substantially co-planar to said mounting face; and
    wherein said nut member is disposed in an opening created by forcing said nut member through said frame.

11. The apparatus according to claim 10, wherein said nut member has a head and a body and said nut member is fixed to said frame by mechanically deforming said body to form a flare for retaining said frame between said head and said flare.

12. An apparatus for mounting components to a motor vehicle comprising:

a frame having a bonding face;

a nut member coupled to said frame wherein said nut member has a mounting face protruding a predetermined distance from said bonding face;

a plastic body panel mounted to said bonding face of said frame, said plastic body panel having a portion with an inner face and an outer face defining a thickness substantially equivalent to said predetermined distance, said plastic panel further having an aperture extending through said thickness;

wherein said nut member is disposed in said aperture of said plastic body panel and said outer face is substantially co-planar to said mounting face; and further including a door hinge clasp having a mounting surface wherein said door hinge clasp is coupled to said frame and said mounting surface is adjacent said nut mounting face.

13. A motor vehicle having a hard mount for interconnecting body components comprising:

a vehicle frame structure;

a plastic body panel supported by said vehicle frame structure;

a nut member having a mounting face, said nut member coupled to said vehicle frame structure wherein said plastic body panel has an inner face coupled to said vehicle frame structure and an outer face substantially co-planar with said mounting face of said nut member;

a vehicle component having a fastener aperture, said vehicle component in direct contact with said mounting face of said nut member; and a fastener disposed in said fastener aperture of said vehicle component and said nut member for coupling said vehicle component to said vehicle frame structure; and wherein said vehicle component is a door hinge.

* * * * *